US012117133B2

(12) United States Patent
Schug

(10) Patent No.: US 12,117,133 B2
(45) Date of Patent: Oct. 15, 2024

(54) SELF-CENTERING RING FOR AN LED RETROFIT LAMP, LED RETROFIT LAMP, AND VEHICLE HEADLIGHT

(71) Applicant: Lumileds LLC, San Jose, CA (US)

(72) Inventor: Josef Andreas Schug, Würselen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 18/464,687

(22) Filed: Sep. 11, 2023

(65) Prior Publication Data

US 2024/0084978 A1 Mar. 14, 2024

Related U.S. Application Data

(60) Provisional application No. 63/405,656, filed on Sep. 12, 2022.

(51) Int. Cl.

| | |
|---|---|
| ***F21K 9/235*** | (2016.01) |
| ***F21K 9/237*** | (2016.01) |
| ***F21S 41/141*** | (2018.01) |
| ***F21S 41/19*** | (2018.01) |
| ***F21Y 115/10*** | (2016.01) |

(52) U.S. Cl.

CPC .............. *F21K 9/235* (2016.08); *F21K 9/237* (2016.08); *F21S 41/141* (2018.01); *F21S 41/192* (2018.01); *F21Y 2115/10* (2016.08)

(58) Field of Classification Search

CPC ........ F21K 9/235; F21K 9/237; F21S 41/192; F21S 41/141

See application file for complete search history.

(56) References Cited

U.S. PATENT DOCUMENTS

| | | | | |
|---|---|---|---|---|
| 6,989,768 | B2 * | 1/2006 | DeMarco | B64D 47/06 362/548 |
| 8,287,168 | B2 * | 10/2012 | Taniuchi | F21V 23/006 362/249.02 |
| 8,313,348 | B2 * | 11/2012 | Mertens | H01J 5/54 439/619 |
| 10,876,725 | B1 * | 12/2020 | Lan | F21V 29/773 |
| 2006/0245198 | A1 * | 11/2006 | Chen | F21S 41/194 362/459 |
| 2007/0274090 | A1 * | 11/2007 | Tiesler-Wittig | F21S 41/194 362/519 |
| 2018/0299093 | A1 * | 10/2018 | Lai | F21S 41/192 |
| 2019/0242542 | A1 * | 8/2019 | Hou | F21S 41/194 |
| 2022/0316659 | A1 | 10/2022 | Heffels et al. | |

FOREIGN PATENT DOCUMENTS

| | | |
|---|---|---|
| DE | 202020101383 | 3/2020 |

* cited by examiner

*Primary Examiner* — Bryon T Gyllstrom
(74) *Attorney, Agent, or Firm* — Volpe Koenig

(57) ABSTRACT

A self-centering ring for an LED retrofit lamp, an LED retrofit lamp, and a vehicle headlight are described. The lamp includes a ring-shaped body that includes an outer ring and an opening in a central region of the ring-shaped body that receives the LED retrofit lamp.

13 Claims, 16 Drawing Sheets

SELF-CENTERING RING FOR AN LED RETROFIT LAMP, LED RETROFIT LAMP, AND VEHICLE HEADLIGHT

CROSS REFERENCE TO RELATED APPLICATION

This application claims the benefit of U.S. provisional application No. 63/405,656, filed on Sep. 12, 2022, the contents of which is hereby incorporated by reference herein.

BACKGROUND

Light emitting diodes (LEDs) more and more replace older technology light sources, such as halogen, gas-discharge, and Xenon lamps, due to superior technical properties, such as, for example, energy efficiency and lifetime. Such older technology light sources may also be referred to as conventional lamps. This may also be true for demanding applications, for example, in terms of luminance, luminosity, and/or beam shaping, such as, for example, vehicle headlighting. Considering the vast installation base of conventional lamps, providing so-called LED retrofit lamps, or LED retrofits for short, more or less one-to-one replacing conventional lamps while allowing continued use of the other system components, such as optics (reflectors, lenses, etc.) and luminaires, may be of great economic interest.

SUMMARY

A self-centering ring for an LED retrofit lamp, an LED retrofit lamp, and a vehicle headlight are described. The lamp includes a ring-shaped body that includes an outer ring and an opening in a central region of the ring-shaped body that receives the LED retrofit lamp.

BRIEF DESCRIPTION OF THE DRAWINGS

A more detailed understanding can be had from the following description, given by way of example in conjunction with the accompanying drawings wherein.

DETAILED DESCRIPTION

Figure 1:
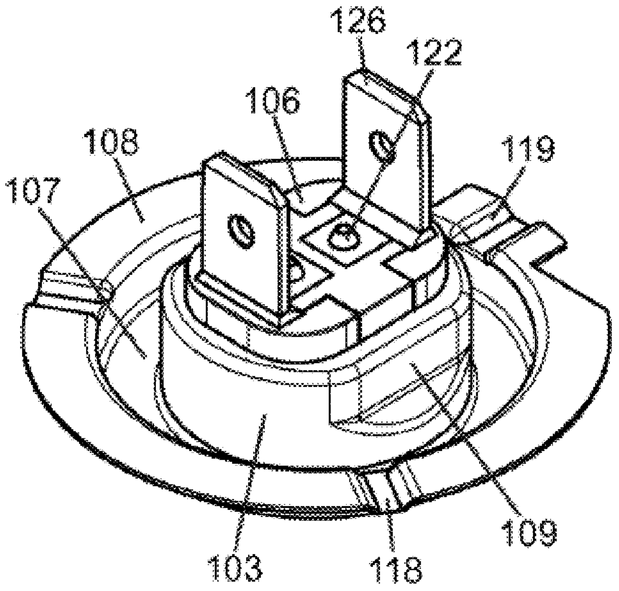
FIG. 1 is a perspective view of a cap of a conventional halogen lamp.

For an LED retrofit providing a fully functional replacement of a conventional lamp, besides the general light technical requirements, many further constraints incurred by the continued use of the other system components have to be respected. Besides light technical data like luminance and angular light distribution, mechanical boundary conditions as to size and shape arise as the LED retrofit has to fit into the same installation space as the conventional lamp it replaces, and, in particular, the LED retrofit has to use the same fixation mechanism as the replaced conventional lamp. In that context, the embodiments described herein provide for centering rings, sometimes also termed center, adapter, or, simply, mounting or fixation rings, which may be used for mounting a lamp within a corresponding lamp fixture of a vehicle light, such as a vehicle front light (headlamp) or rear light.

For example, LED retrofit (LRF) light sources for headlighting applications (e.g., H7 LED retrofit light sources) can replace halogen light sources in automotive headlamps. The LEDs on the LRF light source may be a substitute for the filament of the halogen light source. The beam pattern of a headlamp, and particularly of reflector optics headlamps, is strongly dependent on the exact position of the light source in the headlamp. The position of the filament in a halogen light source relative to the reference system defined by the bulb holder is specified with an accuracy down to ±0.15 mm for the most accurate types (e.g., H7). Such a high accuracy must also be the target for an LRF light source.

In addition, unlike halogen light sources, LRF light sources are often assemblies of a part that establishes the interface to the headlamp (called the centering ring herein) and the body of the light source that carries the LEDs, the electronics, and the means to dissipate the heat. This body of the light source can be disassembled from the centering ring to ease or enable the installation in a car headlamp. However, that implies that the reassembly of the two pieces needs to guarantee the above-mentioned high mechanical accuracy.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only, and they are not intended to limit the disclosure in any way. Like numbers refer to like elements unless explicitly otherwise indicated.

It will be understood that, although the terms first, second, third, etc. may be used herein to describe various elements, these elements should not be limited by these terms. These terms may be used to distinguish one element from another. For example, a first element may be termed a second element, and a second element may be termed a first element without departing from the scope of the present invention. As used herein, the term "and/or" may include any and all combinations of one or more of the associated listed items.

Relative terms such as "below," "above," "upper," "lower," "horizontal," or "vertical" may be used herein to describe a relationship of one element, layer, or region to another element, layer, or region as illustrated in the figures. It will be understood that these terms are intended to encompass different orientations of the device in addition to the orientation depicted in the figures.

FIG. 1 is a schematic perspective rear view of a cap of a conventional halogen lamp as used, for example, in H7 lamps for vehicle headlights. In the example illustrated in FIG. 1, and as described in U.S. Pat. No. 8,313,348, which is hereby incorporated by reference herein in its entirety, the halogen lamp includes a lateral wall arrangement 103, an electrical insulating interface 106, an upper side ring 107, an outer flange 108, planar opposing walls 109, recesses 118, a key feature 119, electrical contacts 122, and a cone-shaped aperture 126. The ring 107 may be a centering ring and may be used to mount a lamp in a lamp receptacle of a vehicle light, such as for the H7 vehicle headlight, in a manner aligned to the optical components of the headlight.

Figure 2:
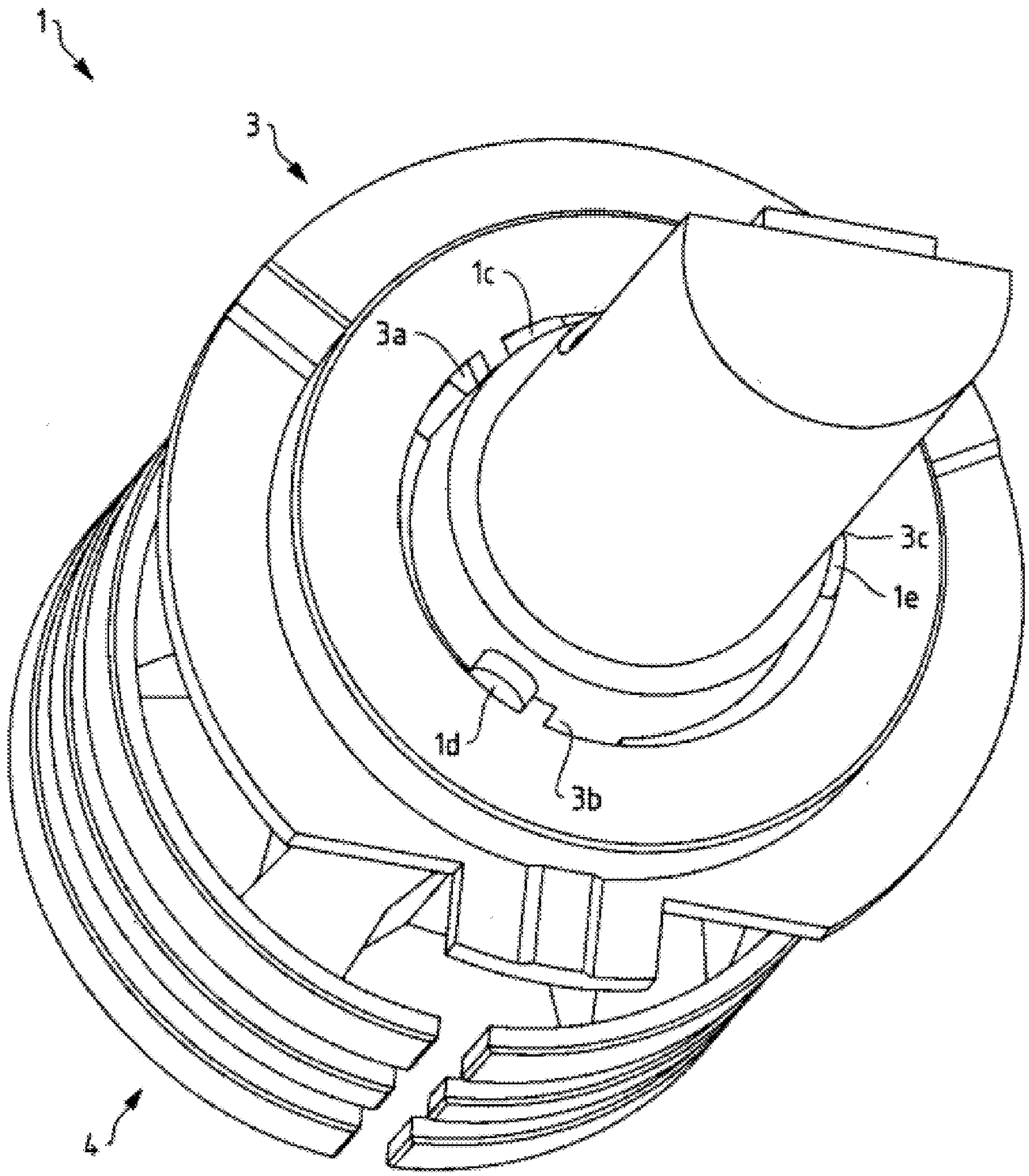
FIG. 2 is a perspective view of an existing LED retrofit lamp.

FIG. 2 shows a schematic perspective view of an existing LED retrofit lamp foreseen for replacing a conventional lamp, such as a halogen H7 lamp, as shown in FIG. 1. In the example illustrated in FIG. 2, and as described in DE202020101383U1, which is hereby incorporated by reference herein in its entirety, the LED retrofit lamp includes an illumination body 1, fixation mechanisms 1*c*, 1*d*, 1*e*, adapter ring 3, and recesses 3*a*, 3*b*, 3*c*, and a cooling body or heatsink 4. Although depicted with regard to an H7 lamp, similar structures exist for use with H1, H3, H4, H7, H11, HB3, and HB4 lamps. The adapter ring 3 may be a centering ring.

Figure 3B:
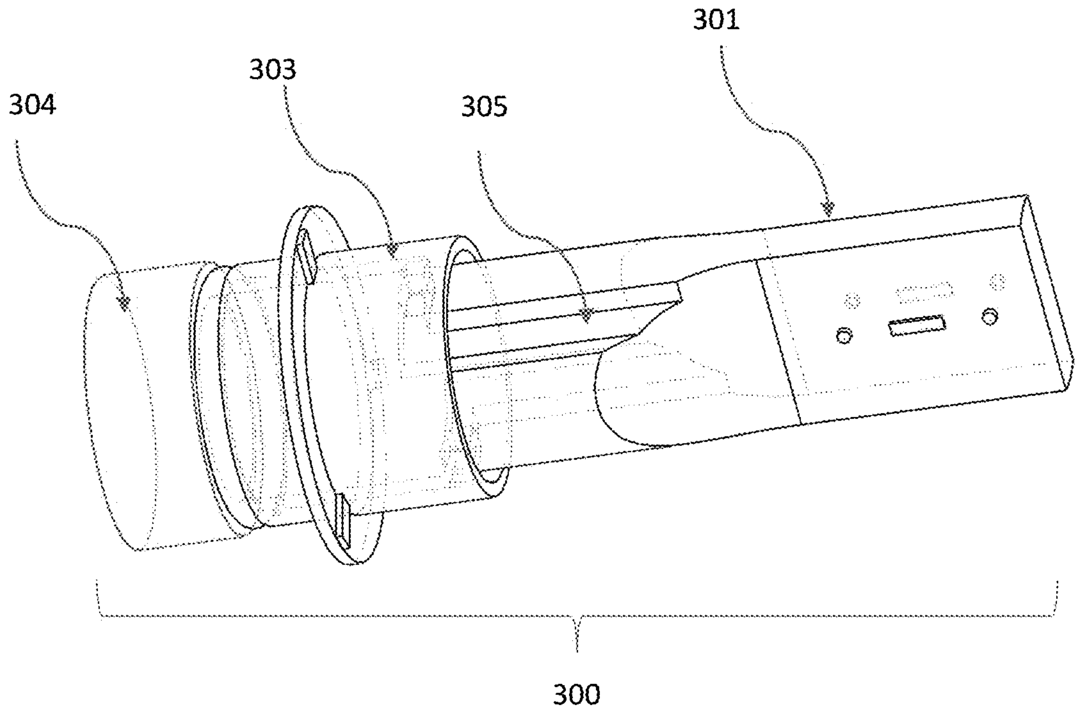
FIG. 3A and FIG. 3B are perspective views of an existing LED retrofit lamp.
Figure 3A:
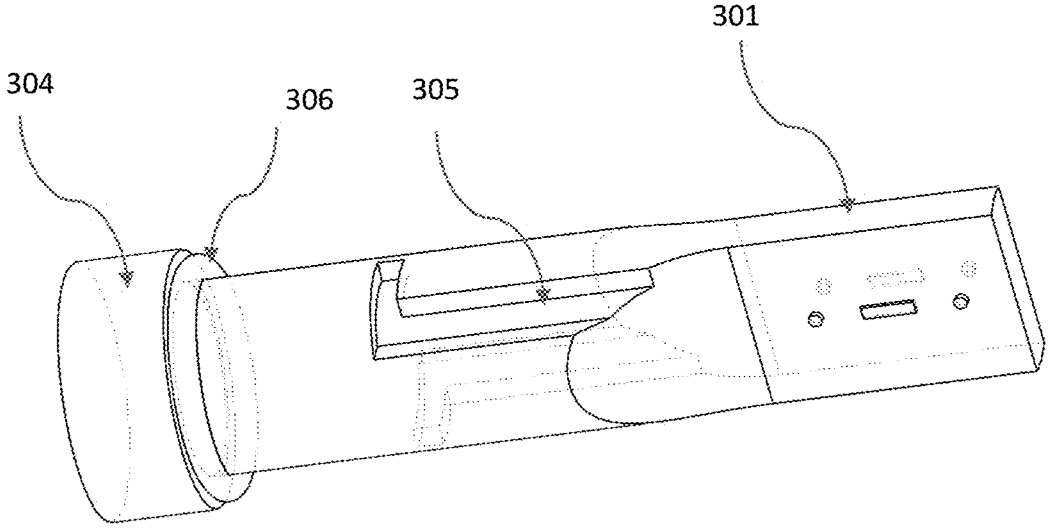

FIGS. 3A and 3B show a schematic perspective view of another existing LED retrofit lamp 300. FIG. 3B illustrates the existing LED retrofit lamp 300 and FIG. 3B illustrates the existing LED retrofit lamp 300 with the centering ring 303 removed. The existing LED retrofit lamp 300 includes an illumination body 301 that has a channel 305 and a heat sink 304. In some instances, the heat sink 304 is integrally formed with the illumination body 301. In other instances, the heat sink 304 is removably coupled to the illumination body 301. The illumination body 301 may be coupled to a lamp fixture of a vehicle light by the centering ring 303 using the groove 305. An elastic O-ring washer 306 may abut the heat sink 304 and the centering ring 303 and may be deformed when the centering ring is tightened onto the illumination body 301.

Figure 3C:
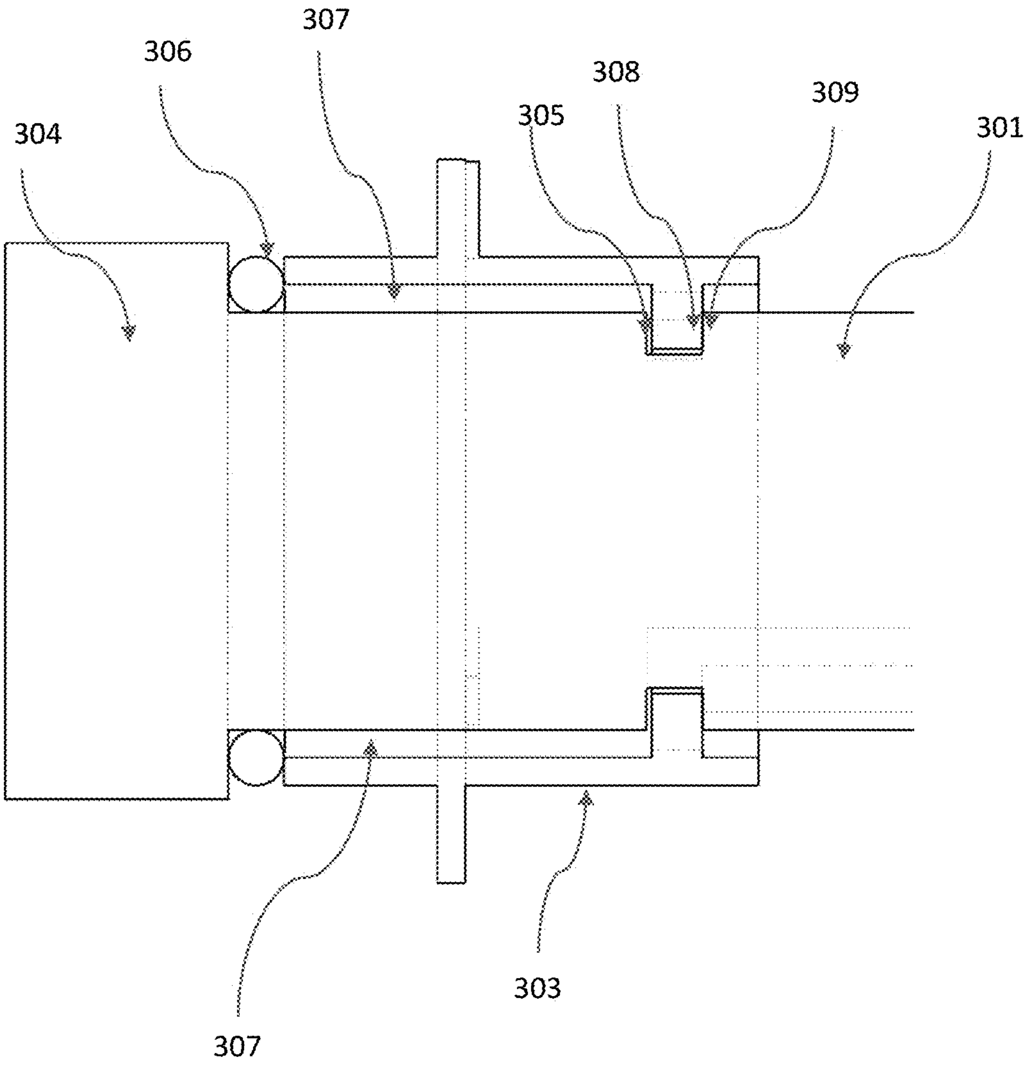
FIG. 3C is a zoomed in cross-sectional view of an existing LED retrofit lamp.

FIG. 3C illustrates a zoomed-in schematic view of the interface between the centering ring 303 and the illumination body 301 when the centering ring 303 is tightened in the existing LED retrofit 300. The illumination body 301 may be coupled to a lamp fixture of a vehicle light by the centering ring 303 using the groove 305 and the lug 308. The lug 308 is a flange that protrudes towards the center of the centering ring 303 and contacts the sidewall 309 of the grove 305. During the assembly of the illumination body 301 with the centering ring 303, the lug 308 first slides through the axial part of the groove 305 and then is locked by a rotational movement into the radial part of the groove 305 (not shown in figures).

In some instances, existing LED retrofit lamps have a lug 308 which is part of the illumination body 301 and a groove 305 which is part of the centering ring 303. An example of the functionality achieve in existing LED retrofit lamps is described in U.S. patent application Ser. No. 17/710,322 entitled "Centering Ring For An LED Retrofit For A Vehicle Light," which is hereby incorporated by reference in its entirety.

When the centering ring 303 is tightened on the illumination body 301, space 307 is formed between the cylindrical outer section of the illumination body 301 and the inner section of the centering ring 303. The space 307 is required because the inner diameter of the centering ring 303 needs to be larger than the outer diameter of the illumination body 301 to account for tolerances in the manufacturing of both components. However, the space 307 may result in a potential lateral shift of the illumination body 301 in the centering ring 301. The contact surfaces between the lug 308 and the side wall of the groove 309 are essentially planar and perpendicular to the axis of the centering ring 303 and the axis of the illumination body 301. Thus, there is no self-centering functionality associated with this interface. In addition, the space 307 may result in a potential tilting of the illumination body 301, which may displace the LED even more significantly. Further, the deformation of the O-ring 306 due to the tightening of the centering ring 303 may further contribute to the tilting.

Figure 4B:
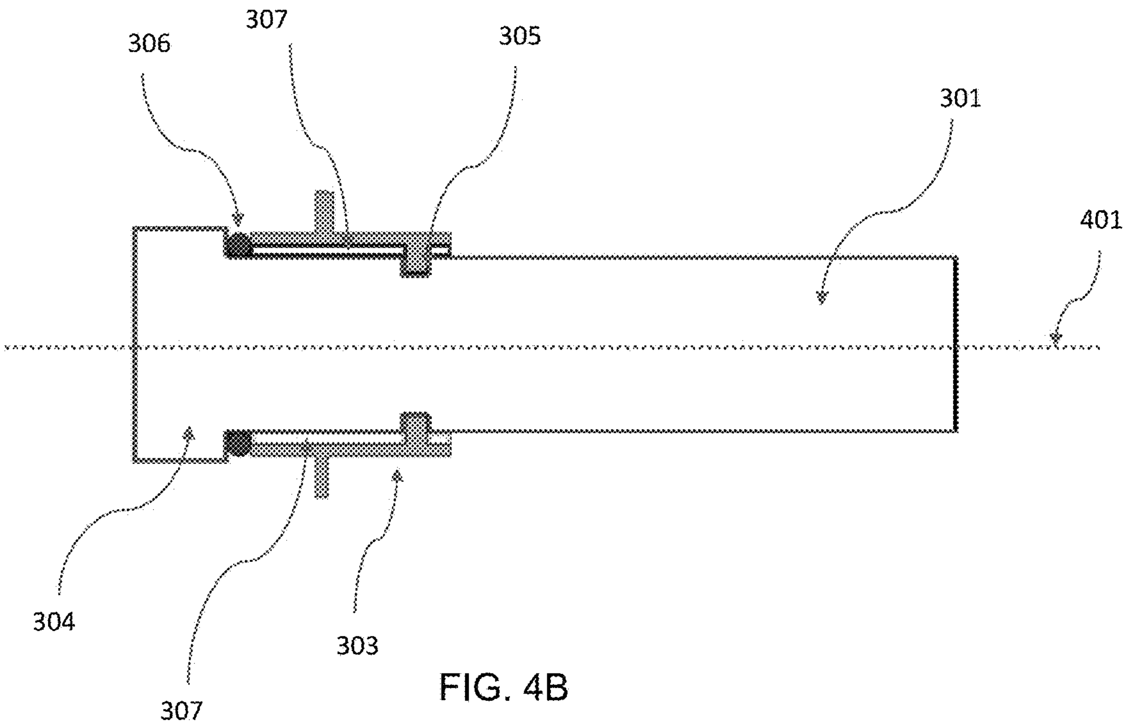
FIG. 4A and FIG. 4B are cross-sectional views of the existing LED retrofit lamp of FIG. 3B showing displacement between the axis of the centering ring and the axis of the illumination body of the LED retrofit lamp.
Figure 4A:
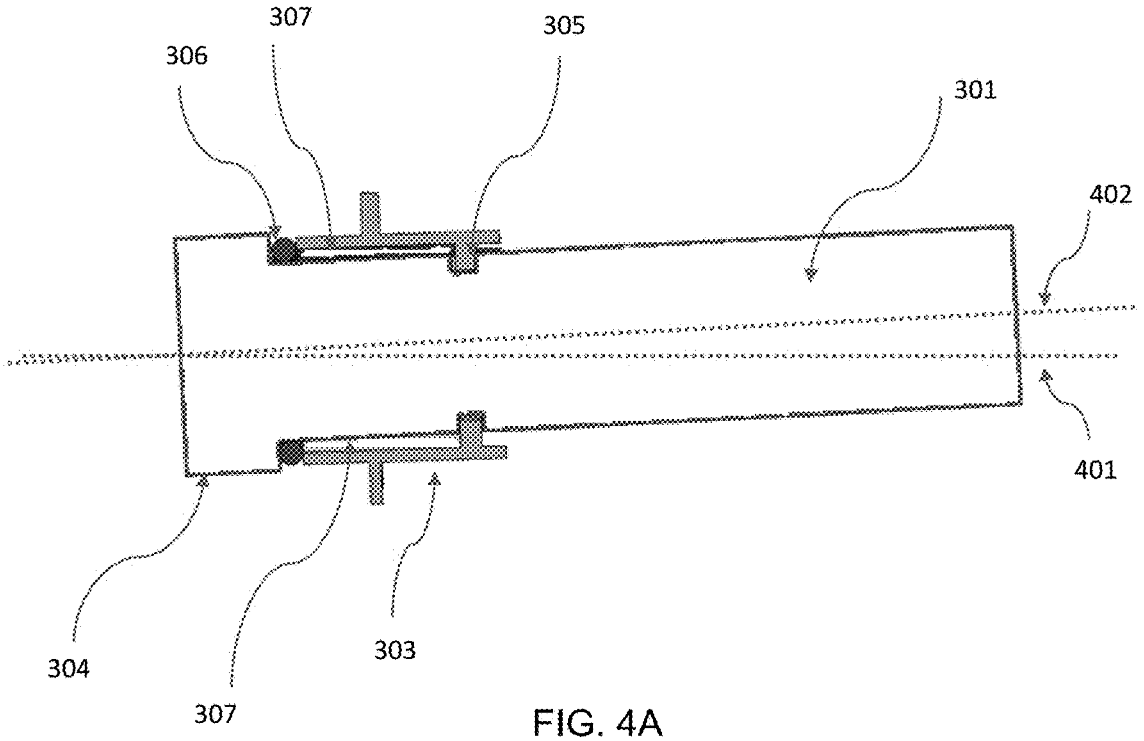

An example of the tilting of the illumination body 301 that is possible in the existing LED retrofit lamp 300 due to gap 307 is illustrated in FIGS. 4A and 4B. FIG. 4B illustrates a situation when the gap 307 is constant between centering ring 303 and the illumination body 301. The gap 307 is constant when the illumination body 301 and the centering ring 303 are coaxially aligned along a common axis 401.

FIG. 4A illustrates an example of the tilting that occurs when the illumination body 301 and the centering ring 303 are not coaxially aligned along a common axis 401. In this example, the centering ring 303 is still coaxially aligned with the axis 401. However, in this example, the gap 307 is not constant around the illumination body 301. As a result, the illumination body 301 is coaxially centered about axis 402. Although the difference in the gap 307 along the centering ring 303 is small, the resulting effect on the displacement of the light emitted by the illumination body 301 is large due to the length of the illumination body 301

Figure 5B:
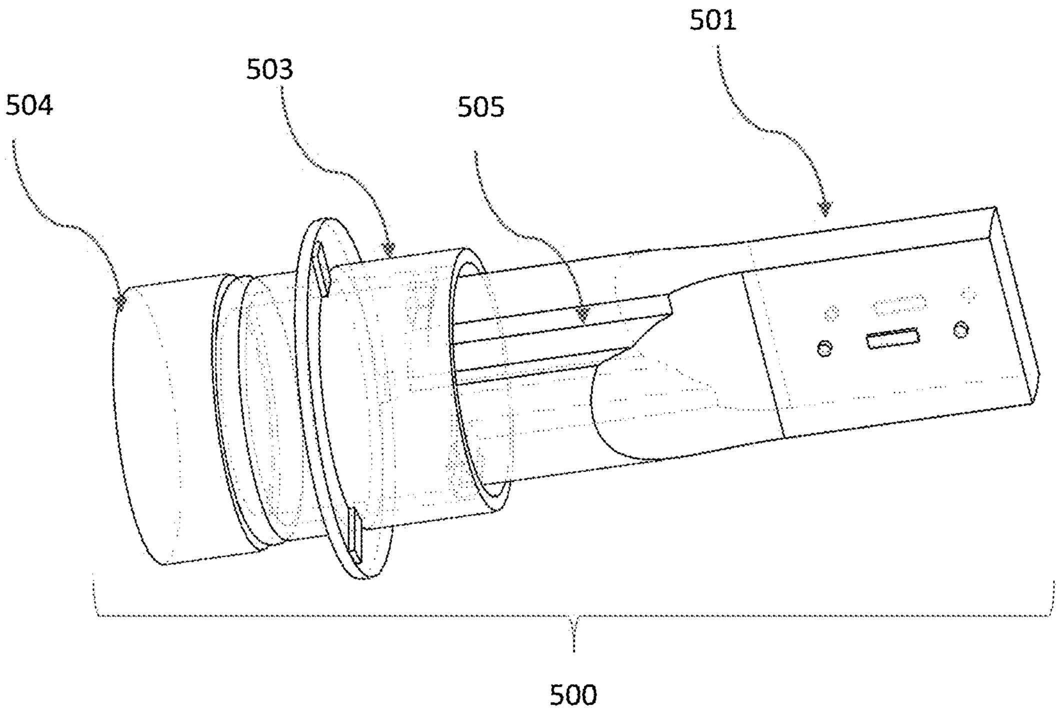
FIG. 5A and FIG. 5B are perspective views of an example LED retrofit lamp.
Figure 5A:
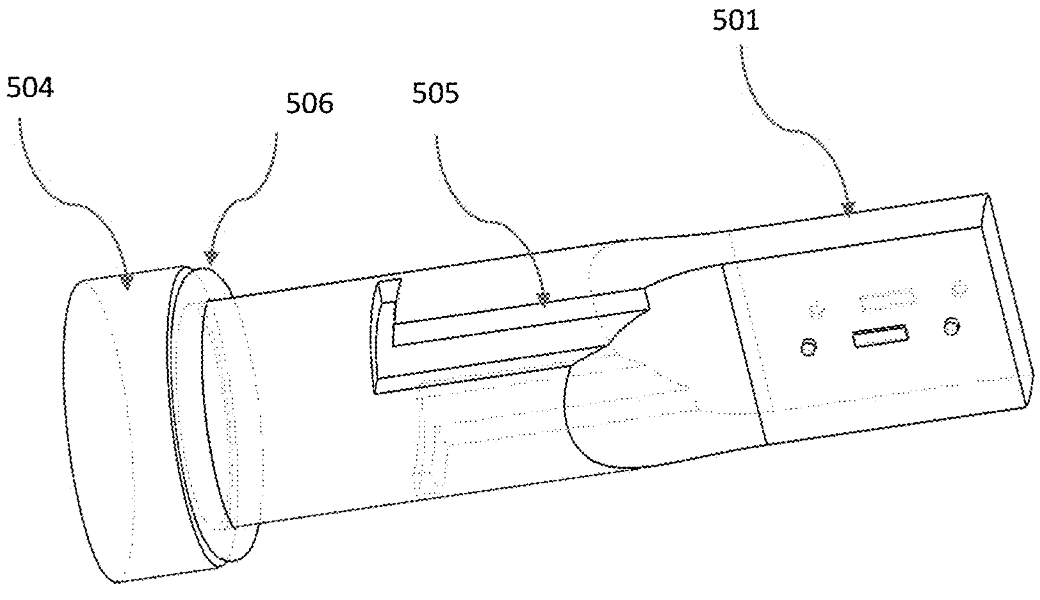

FIGS. 5A and 5B show a schematic perspective view of an embodiment of an LED retrofit lamp in accordance with one or more aspects of the embodiments described herein. In the example illustrated in FIGS. 5A and 5B, the LED retrofit lamp 500 includes an illumination body 501 that has a channel 505 and a heat sink 504. In some instances, the heat sink 504 is integrally formed with the illumination body 501. In other instances, the heat synch 504 is removably coupled to the illumination body 501. The illumination body 501 may be coupled to a lamp fixture of a vehicle light by the centering ring 503 using the groove 505. An elastic O-ring washer 506 may abut the heat sink 504 and the centering ring 503 and may be deformed when the centering ring is tightened onto the illumination body 501.

The LED retrofit lamp 500 may be similar to the existing LED retrofit lamp 300. However, the geometry of the channel 505 and the centering ring 503 are different. The differences in the geometry of the channel 405 and the centering ring 503 allow the LED retrofit lamp 500 to self-center and therefore maintain a constant gap 407 between the centering ring 503 and the illumination body 501. By maintaining a constant gap 507 between the centering ring 503 and the illumination body 501, the tilting of the existing LED retrofit lamp 500, as shown in FIG. 4A, may be eliminated. The similarity with existing LED retrofit lamp 300 allows for the self-centering to occur without requiring a dramatic change in the design of the illumination body 501.

Figure 5C:
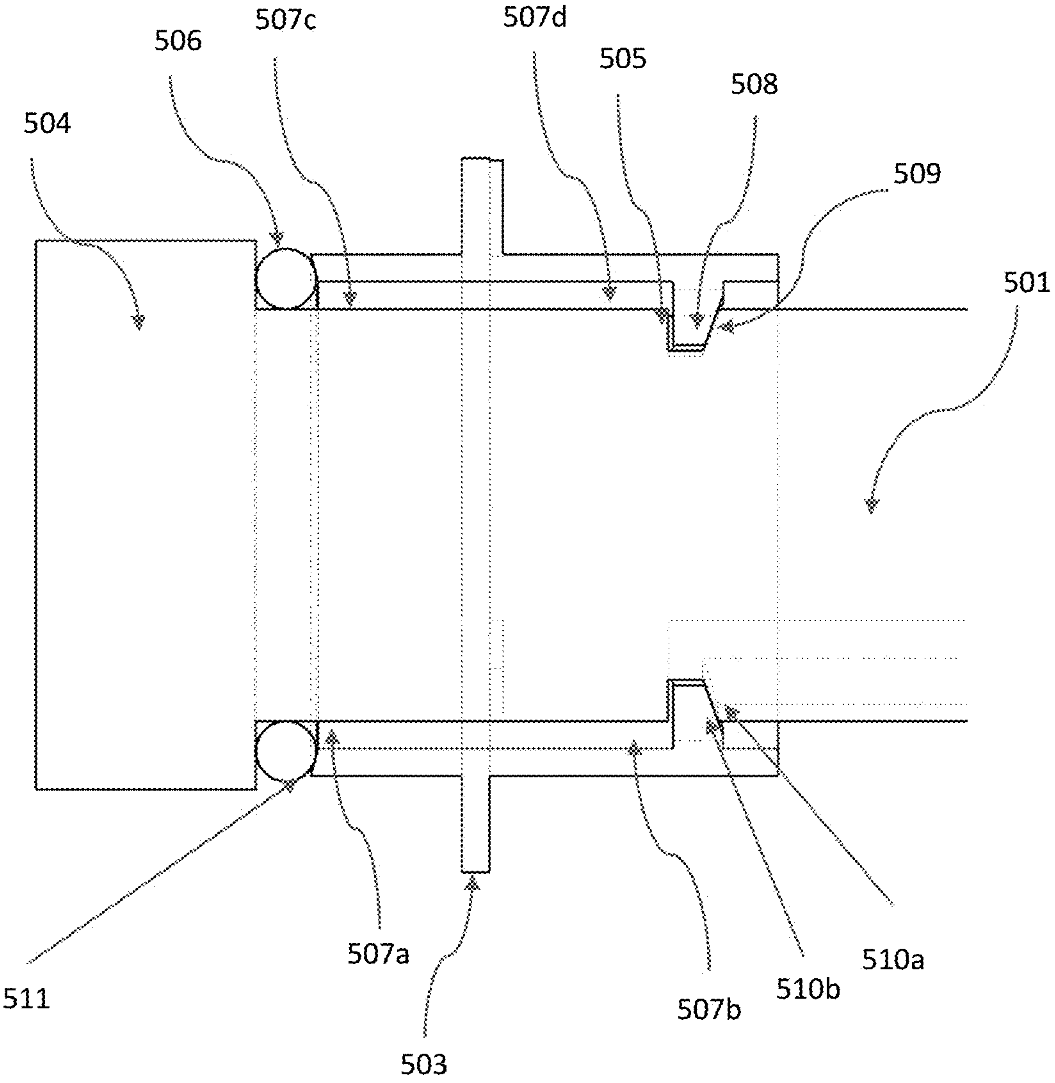
FIG. 5C is a zoomed in cross-sectional view of an example LED retrofit lamp.

FIG. 5C illustrates a zoomed-in cross-sectional schematic view of the interface between the centering ring 503 and the illumination body 501 when the centering ring 503 is tightened in the LED retrofit 500. When the centering ring 503 is tightened on the illumination body 501, the gaps 507A-D may be maintained at a constant distance because of the complementary angled features 510A and 510B of the centering ring 503 and the groove 505, respectively. These features assure that at the position of the lugs 508 the illumination body 501 and the centering ring 503 are self-aligned in a concentric configuration. The lug 508 is a flange that protrudes towards the center of the centering ring 503 and contacts the sidewall 509 of the grove 305.

In addition, in some instances, the centering ring 503 includes an additional angled feature 511 that contacts the O-Ring 506. This additional angled feature 511 further helps the centering ring 503 maintain a constant gap 507*a-d* around the illumination body 501. It assures that at the position of the contact surface to the O-ring the illumination body and the centering ring are self-aligned in a concentric configuration. Having a concentric configuration at the position of the lugs 508 and the position of the contact surface to the O-ring 506 assures a coaxial arrangement of the centering ring 503 and the illumination body 501.

During the insertion of the body into the centering ring 503, the lugs 508 may slide over the wall 509 of the groove 505 and cause small deviations from the concentric position. However, in response to the small deviation, the angled features 510B and 510A generate a corrective force that pushes the assembly to the proper concentric alignment.

Figure 5D:
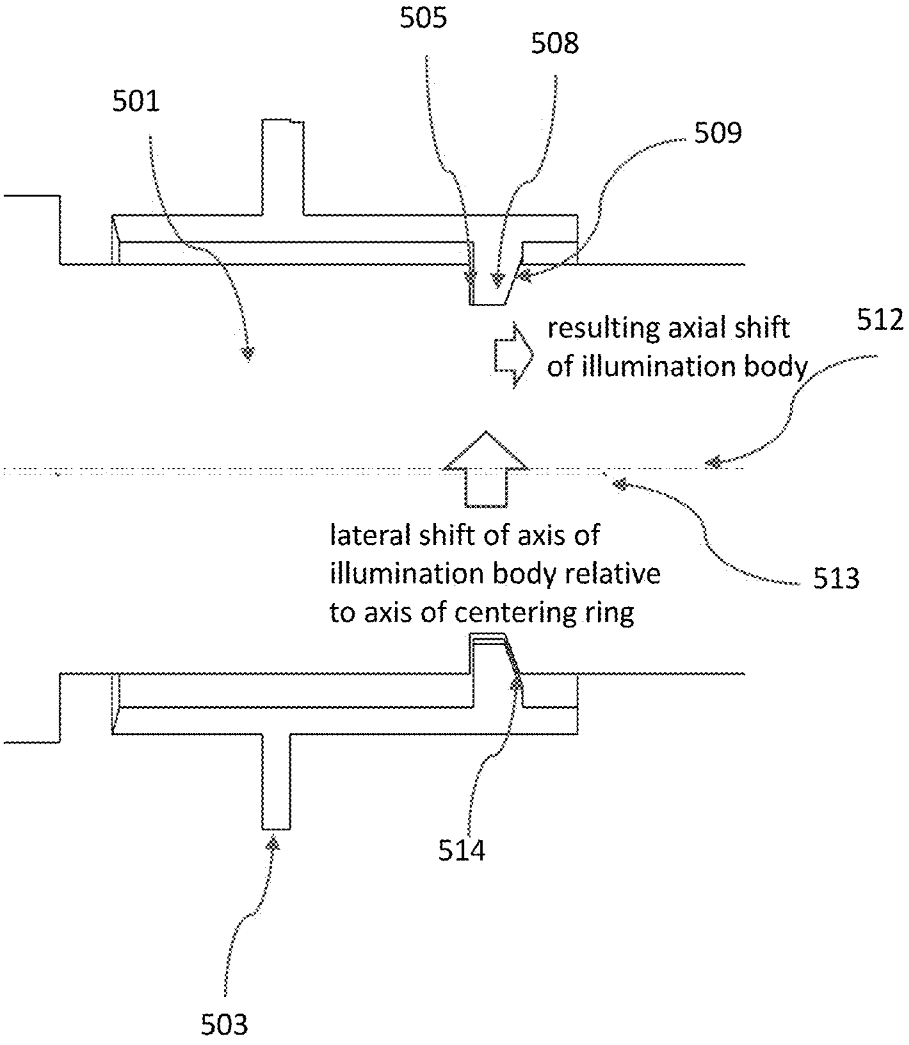
FIG. 5D illustrates the effect of a hypothetical lateral shift of the axis of the illumination body relative to the axis of the centering ring.

FIG. 5D shows the effect of a hypothetical lateral shift of the axis 512 of the illumination body relative to the axis 513 of the centering ring. For example, in case of an angle of 10°, a 0.1 mm eccentricity (offset of the axes) would result in an ~0.02 mm axial movement of the illumination body relative to the centering ring due to the movement along the angled surface. On the opposite side an axial gap 514 of 0.04 mm appears since the angled surfaces 510A and 510B move away from each other. That means that one contact point will receive the full pressure from the elastic O-Ring 506, and the other will be loose. This pressure forces one contact point to "slide down" the inclined surface until forces are balanced again. The friction is relatively small since the illumination body 501 and the centering ring 503 are still in a relative rotational movement to lock the illumination body 501 in the center ring 503. As a result, an angle between 5° and 45° is required for angled feature 510B. Preferably the angle of the angled feature is between 510B is between 7° and 30°.

In some instances, at least two lugs 508 and corresponding angled surfaces 510A and 510B in the groves 509 located on opposite positions (180° relative to each other) of the illumination body 501 and the centering ring 503 are needed to achieve the functionality. However, in other instances, the concept can also be applied for three or more lugs.

Figure 6B:
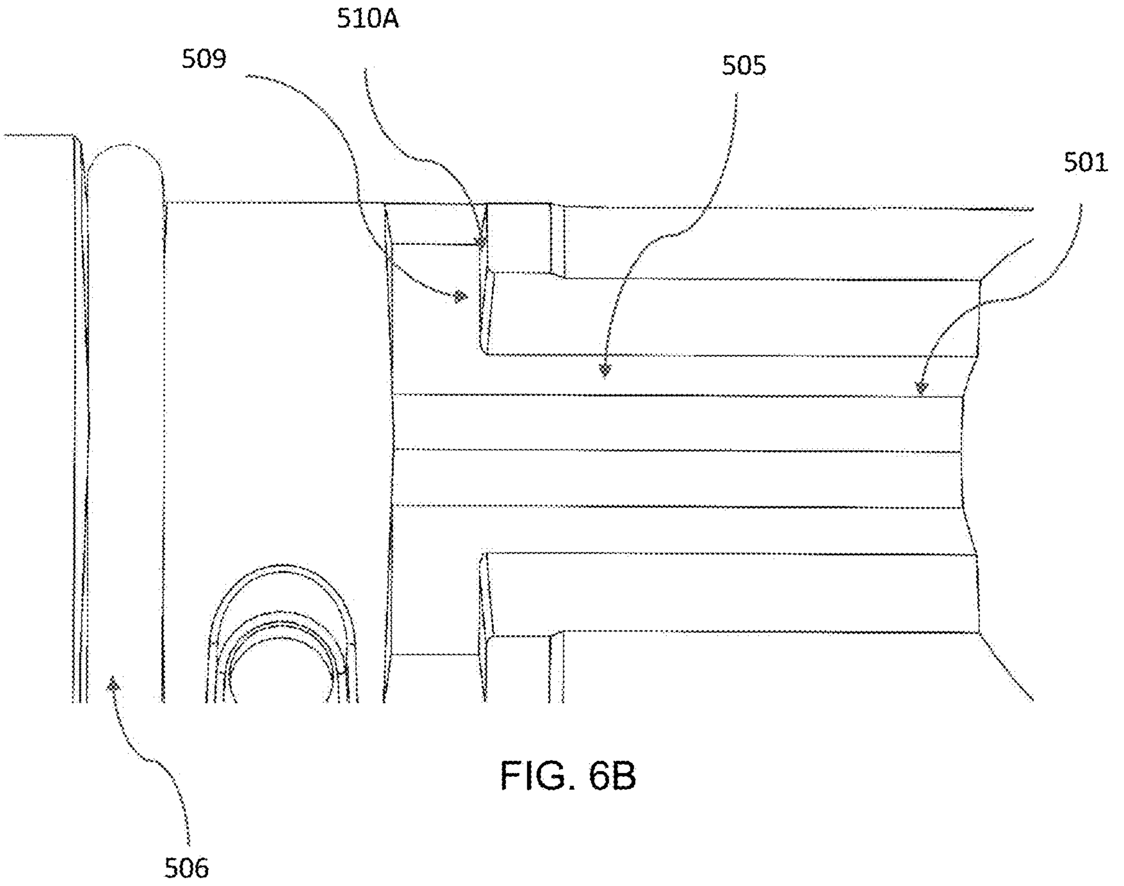
FIG. 6B is a zoomed in view of an example illumination body.
Figure 6A:
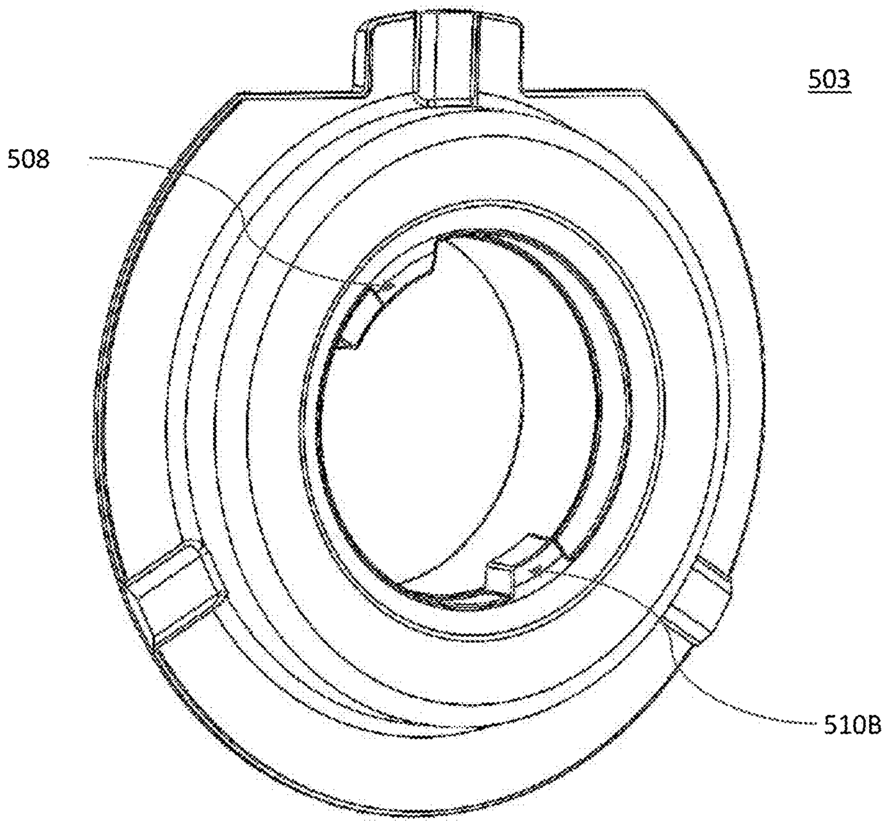
FIG. 6A is a first view of an example centering ring.

FIG. 6A is a zoomed-in view of an embodiment of the centering ring 503 that includes the angled features 510B. The angled features 510B have a complimentary angle with the angled feature 510A of the groove 505. The angle of the angled feature 510B is selected so that the centering ring 503 self-centers the central axis of the centering ring 503 with the central axis of the illumination body 501. FIG. 6B is a zoomed-in view of the illumination body 501 in accordance with an embodiment. FIG. 6B shows the angled feature 510A of the groove 505 that mates to the angled feature 510B of the centering ring 503

Figure 6C:
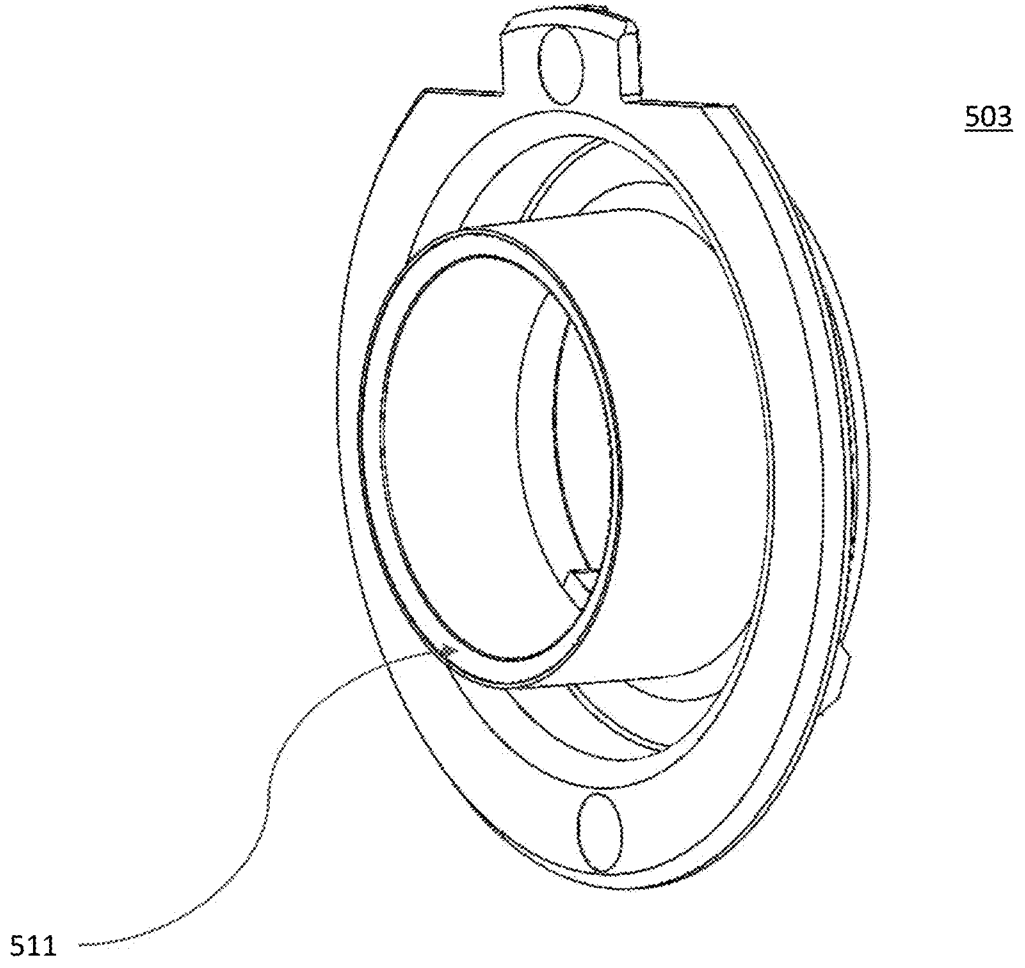
FIG. 6C is a second view of an example centering ring.

FIG. 6C is a zoomed-in view of an embodiment of the centering ring 503 that includes an additional angled feature 511 that contacts the O-Ring 506 when the centering ring 503 is tightened onto the illumination body 501. In some instances, the angle of the additional angled feature 511 may be different than the angle of the angled feature 510A.

Figure 7A:
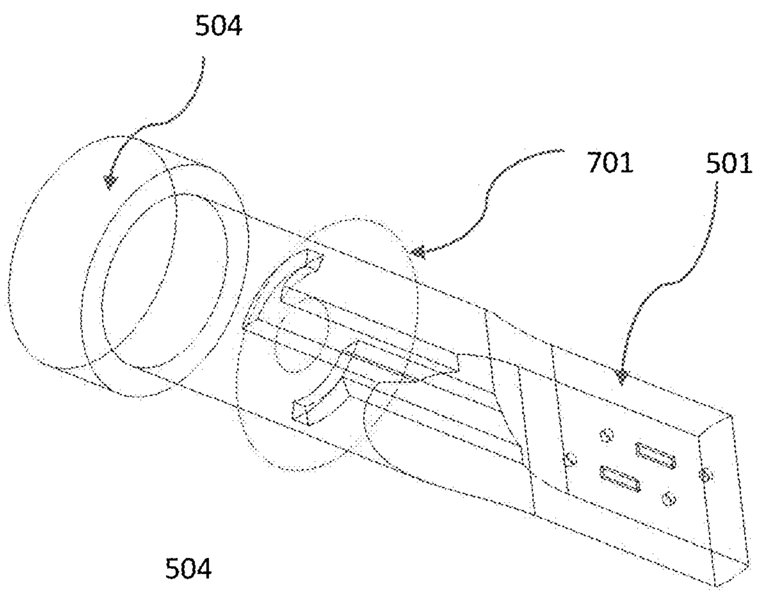
FIG. 7A, FIG. 7B and FIG. 7C show a self-centering effect of the centering ring.
Figure 7B:
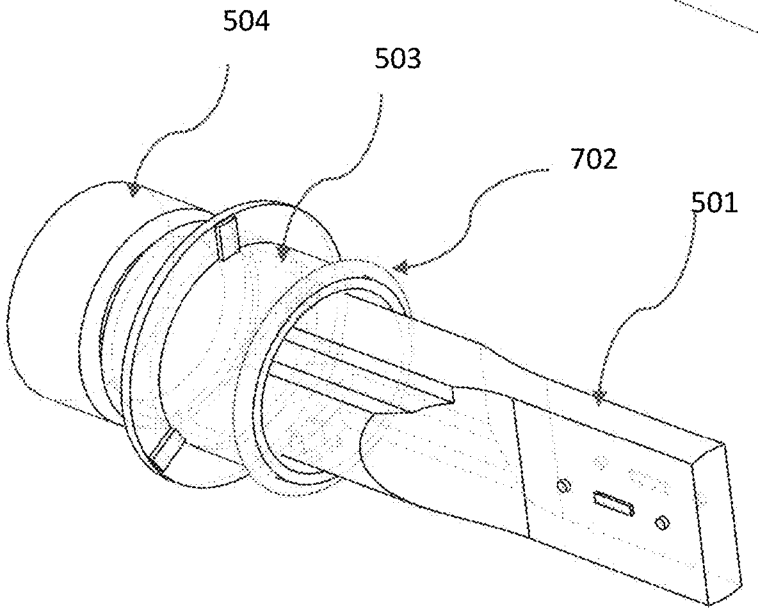
Figure 7C:
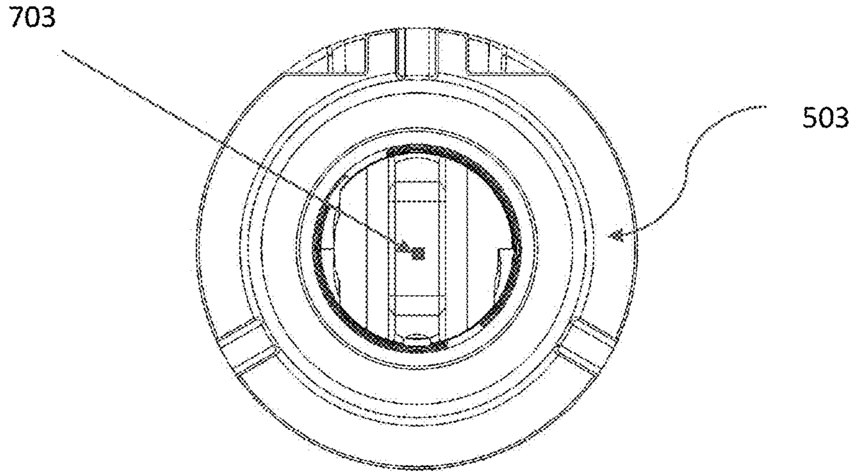

FIGS. 7A, 7B and 7C illustrates an example result of using the centering ring 503 to maintain a constant gap between the centering ring 503 and the illumination body 501. The main challenge for the reference system between the body of the LRF and the centering ring 503 may be to ensure that the central axes of both components are parallel and coinciding. This may be achieved with a reference system that is based on a pair of conical surfaces at both ends of the centering ring 503. The use of conical surfaces may prevent the lateral shift between the body and the centering ring 503 and thus may establish two concentric positions 701 and 702.

FIG. 7A illustrates the concentric position 701 that is centered about the central axis of the illumination body 501. FIG. 7B illustrates the concentric position 702 that is centered about the central axis of the centering ring 503 and aligned with the edge of the centering ring 503 further from the heat sink 504. Since the gap 507A-D may be maintained at a constant distance, circles 701 and 702 may be concentric about a common point 703. FIG. 7C illustrates that the common point 703 of the concentric positions 701 and 702 may be the center of the LED retrofit lamp 500 and, as a result, the tilting observed by the existing LED retrofit lamp 300 illustrated in FIG. 4A may be avoided.

Figure 8A:
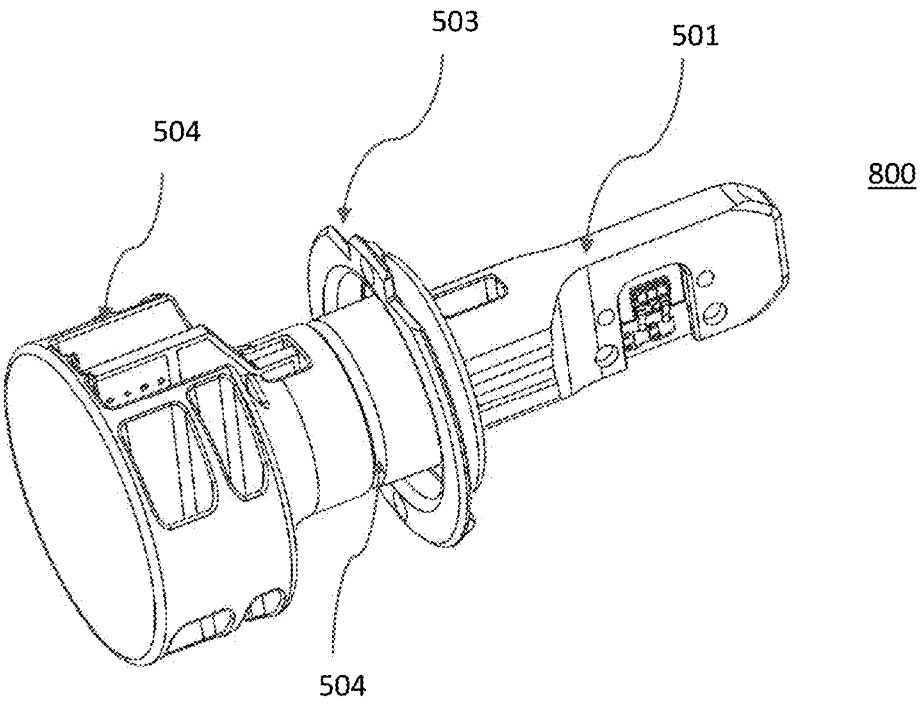
FIG. 8A, FIG. 8B, and FIG. 8BC are perspective views of an additional example LED retrofit lamp.
Figure 8B:
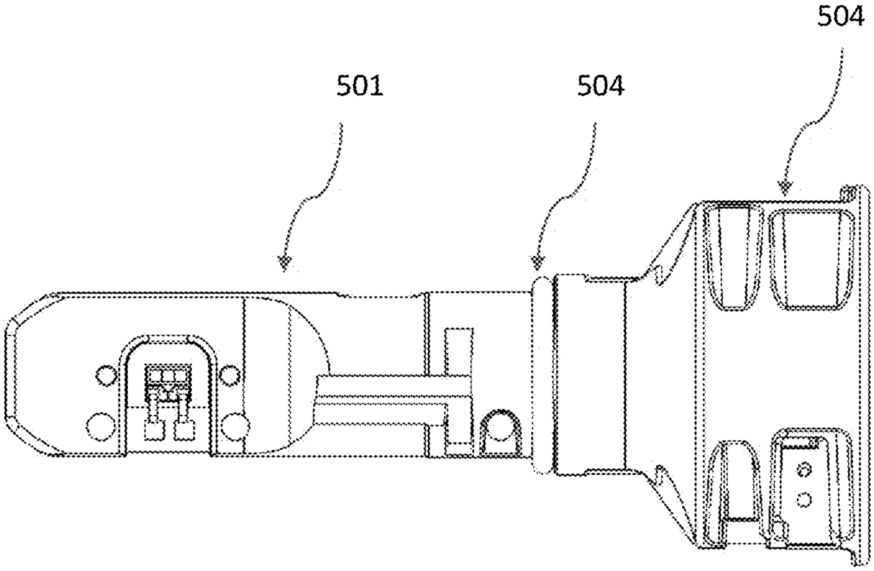
Figure 8C:
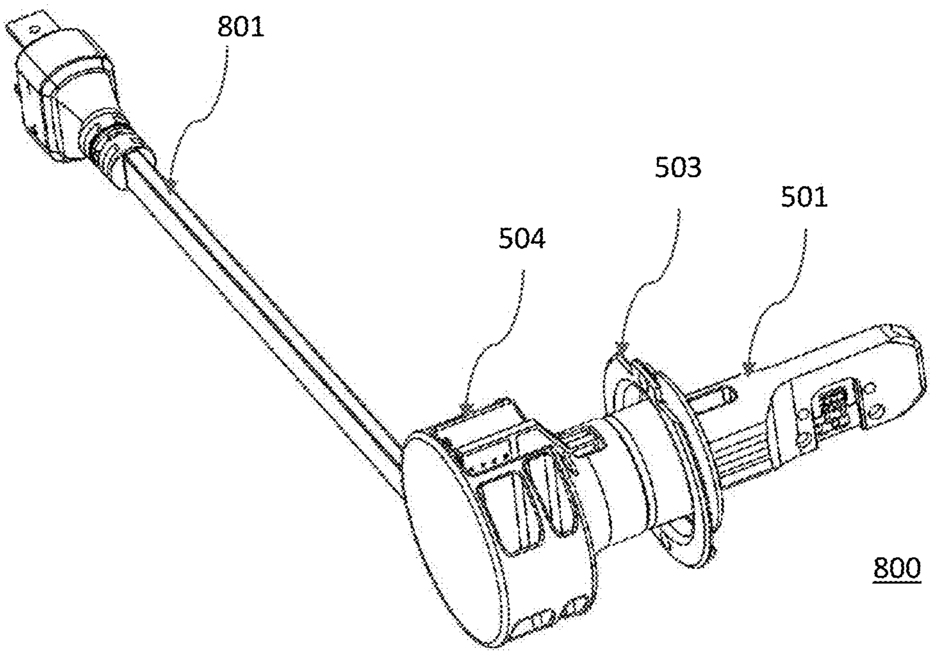

FIGS. 8A, 8B and 8C illustrate an example of an LED retrofit lamp 800 that utilizes the centering ring 503 to self-center the illumination body 501. FIG. 8B illustrates the retrofit lamp 800 with the centering ring 503 removed. FIG. 8C further illustrates the LED retrofit lamp 800 with an electrical connection 801 that electrically couples the LED retrofit lamp 800 to the electrical systems of the vehicle.

Figure 9:
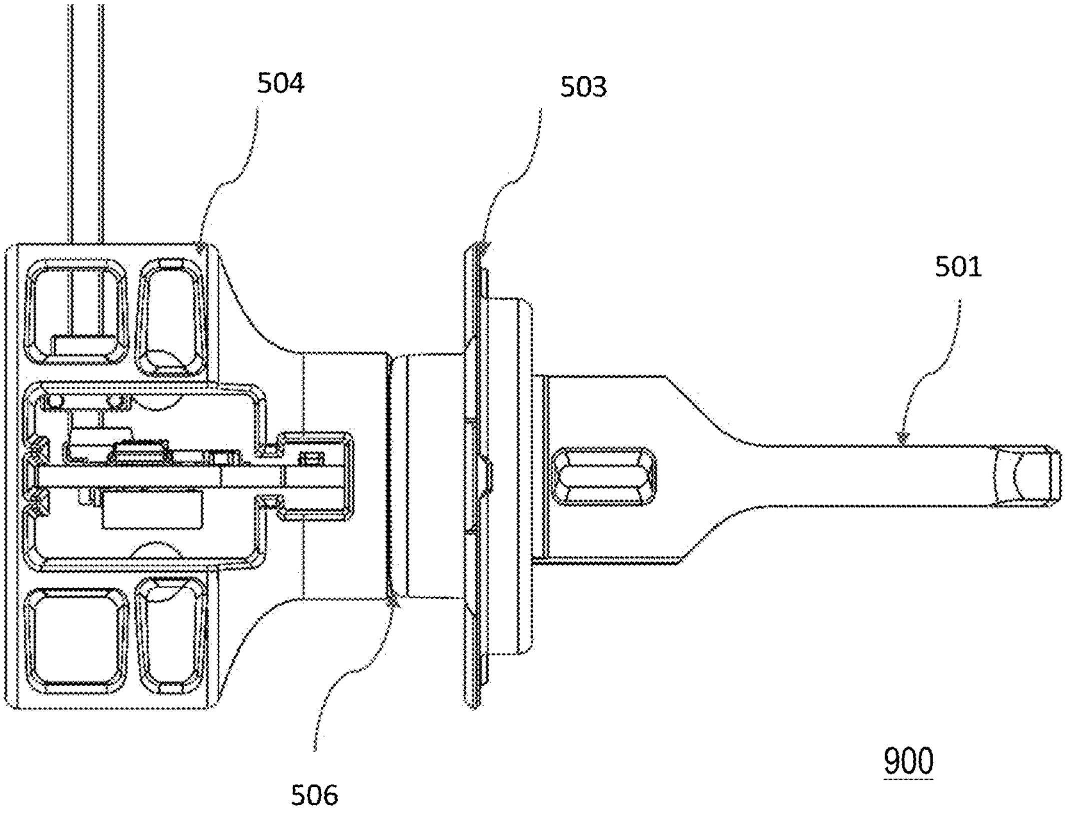
FIG. 9 is a perspective views of an additional example LED retrofit lamp.

FIG. 9 illustrates an additional example of an LED retrofit lamp 900 that utilizes the centering ring 503 to self-center the illumination body 501.

Figure 10:
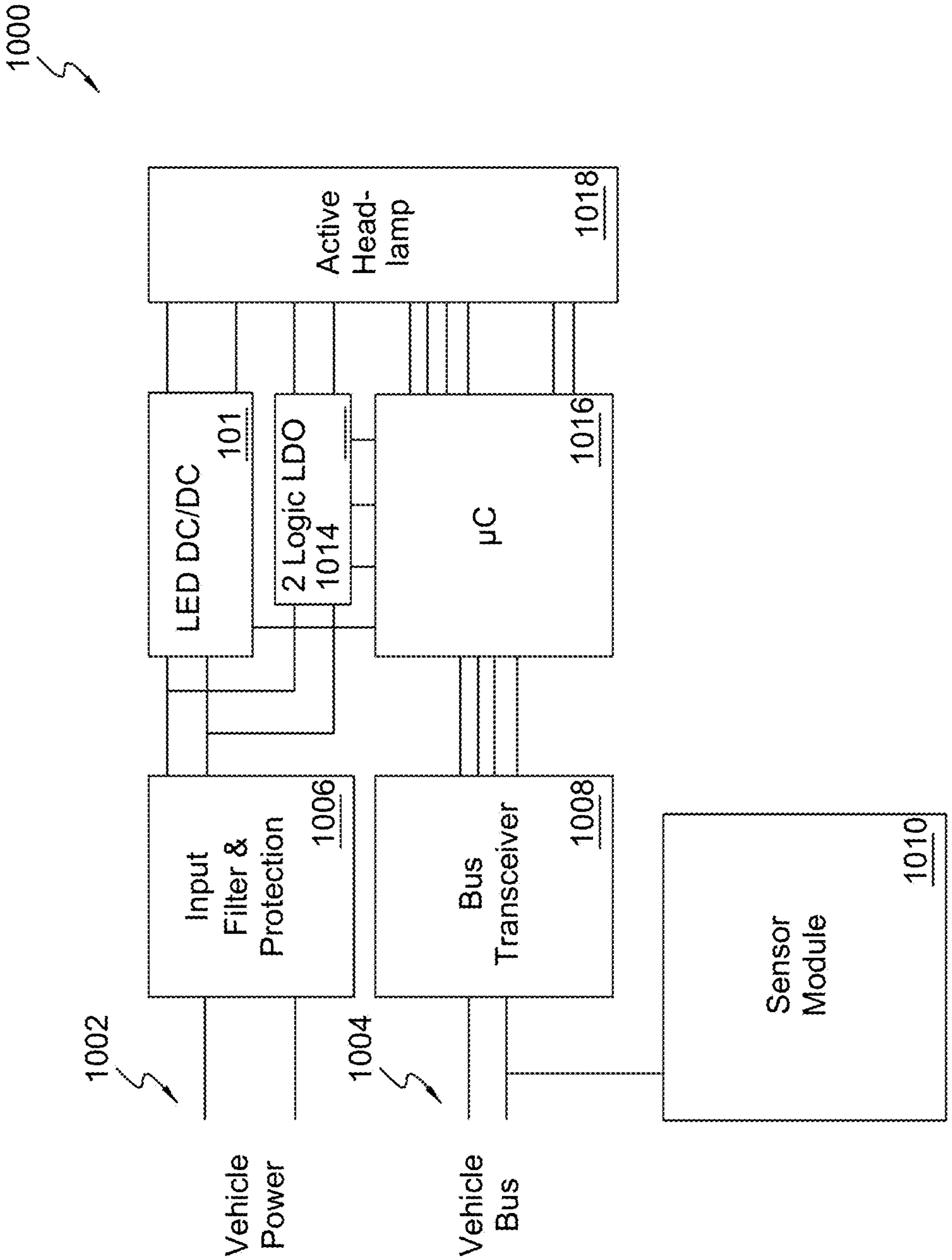
FIG. 10 is a diagram of an example vehicle headlamp system that may incorporate one or more of the embodiments and examples described herein.

FIG. 10 is a diagram of an example vehicle headlamp system 1000 that may incorporate one or more of the embodiments and examples described herein. The example vehicle headlamp system 1000 illustrated in FIG. 10 includes power lines 1002, a data bus 1004, an input filter and protection module 1006, a bus transceiver 1008, a sensor module 1010, an LED direct current to direct current (DC/DC) module 1012, a logic low-dropout (LDO) module 1014, a micro-controller 1016 and an active headlamp 1018.

The power lines 1002 may have inputs that receive power from a vehicle, and the data bus 1004 may have inputs/outputs over which data may be exchanged between the vehicle and the vehicle headlamp system 1000. For example, the vehicle headlamp system 1000 may receive instructions from other locations in the vehicle, such as instructions to turn on turn signaling or turn on headlamps, and may send feedback to other locations in the vehicle if desired. The sensor module 1010 may be communicatively coupled to the data bus 1004 and may provide additional data to the vehicle headlamp system 1000 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 1000. In FIG. 10, the headlamp controller may be a microcontroller, such as a microcontroller (μc) 1016. The microcontroller 1016 may be communicatively coupled to the data bus 1004.

The input filter and protection module 1006 may be electrically coupled to the power lines 1002 and may, for example, support various filters to reduce conducted emissions and provide power immunity. Additionally, the input filter and protection module 1006 may provide electrostatic discharge (ESD) protection, load-dump protection, alternator field decay protection, and/or reverse polarity protection.

The LED DC/DC module 1012 may be coupled between the input filter and protection module 106 and the active headlamp 1018 to receive filtered power and provide a drive current to power LEDs in the LED array in the active headlamp 1018. The LED DC/DC module 1012 may have an input voltage between 10 and 18 volts with a nominal voltage of approximately 13.2 volts and an output voltage that may be slightly higher (e.g., 0.3 volts) than a maximum voltage for the LED array (e.g., as determined by a factor or local calibration and operating condition adjustments due to load, temperature or other factors).

The logic LDO module 1014 may be coupled to the input filter and protection module 1006 to receive the filtered power. The logic LDO module 1014 may also be coupled to the microcontroller 1016 and the active headlamp 1018 to provide power to the microcontroller 1016 and/or electronics in the active headlamp 1018, such as CMOS logic.

The bus transceiver 1008 may have, for example, a universal asynchronous receiver transmitter (UART) or serial peripheral interface (SPI) interface and may be coupled to the microcontroller 1016. The micro-controller 1016 may translate vehicle input based on, or including, data from the sensor module 1010. The translated vehicle input may include a video signal that is transferrable to an image buffer in the active headlamp 1018. In addition, the microcontroller 1016 may load default image frames and test for open/short pixels during startup. In embodiments, an SPI interface may load an image buffer in CMOS. Image frames may be full frames, differential, or partial frames. Other features of microcontroller 1016 may include control interface monitoring of CMOS status, including die temperature, as well as logic LDO output. In embodiments, LED DC/DC output may be dynamically controlled to minimize headroom. In addition to providing image frame data, other headlamp functions, such as complimentary use in conjunction with side marker or turn signal lights and/or activation of daytime running lights, may also be controlled.

Figure 11:
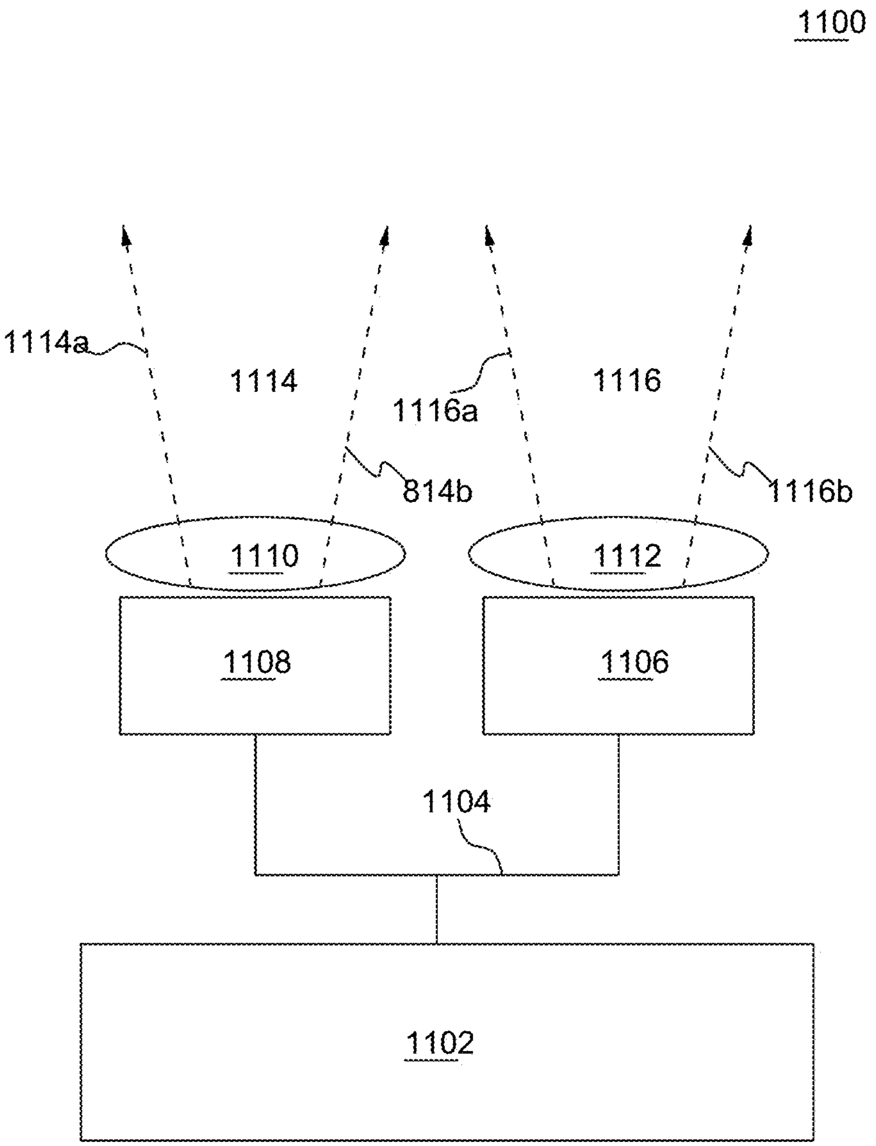
FIG. 11 is a diagram of another example vehicle headlamp system.

FIG. 11 is a diagram of another example vehicle headlamp system 1100. The example vehicle headlamp system 1100 illustrated in FIG. 11 includes an application platform 1102, two LED lighting systems 1106 and 1108, and secondary optics 1110 and 1112.

The LED lighting system 1108 may emit light beams 1114 (shown between arrows 1114*a* and 1114*b* in FIG. 11). The LED lighting system 1106 may emit light beams 1116 (shown between arrows 1116*a* and 1116*b* in FIG. 11). In the embodiment shown in FIG. 11, a secondary optic 1110 is adjacent the LED lighting system 1108, and the light emitted from the LED lighting system 1108 passes through the secondary optic 1110. Similarly, a secondary optic 1112 is adjacent the LED lighting system 1106, and the light emitted from the LED lighting system 1106 passes through the secondary optic 1112. In alternative embodiments, no secondary optics 1110/812 are provided in the vehicle headlamp system.

Where included, the secondary optics 1110/1112 may be or include one or more light guides. The one or more light guides may be edge-lit or may have an interior opening that defines an interior edge of the light guide. LED lighting systems 1108 and 1106 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 1108 and 1106 in a desired manner, such as, for example, with a gradient, a chamfered distribution, a narrow distribution, a wide distribution, or an angular distribution.

The application platform 1102 may provide power and/or data to the LED lighting systems 1106 and/or 1108 via lines 1104, which may include one or more or a portion of the power lines 1002 and the data bus 1004 of FIG. 10. One or more sensors (which may be the sensors in the vehicle headlamp system 1100 or other additional sensors) may be internal or external to the housing of the application platform 1102. Alternatively, or in addition, as shown in the example vehicle headlamp system 1000 of FIG. 10, each LED lighting system 1108 and 1106 may include its own sensor module, connectivity, and control module, power module, and/or LED array.

In embodiments, the vehicle headlamp system 1100 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 1106 and 1108 may be sensors (e.g., similar to sensors in the sensor module 1010 of FIG. 10) that identify portions of a scene (e.g., roadway or pedestrian crossing) that require illumination.

In some instances, one or more components of the LED retrofit lamps are produced using a computer-aided design (CAD) software package. Non-limiting embodiments of the CAD software are Solid Works, ProEngineer, AutoCAD, and CATIA. The CAD software generates a 3-dimensional model of the one or more components of the LED retrofit. In addition, the CAD software generates instructions that, when executed by a Computer Numerical Control (CNC) machine, cause the CNC machine to produce the one or more components of the LED retrofit according to the 3-dimensional model generated by the CAD software package. Examples of CNC machines that may be utilized to produce the one or more components of the LED retrofit lamps include drills, lathes, mills, grinders, routers, and 3D printers. In some instances, the instructions, when executed by the CNC machine, cause the CNC to generate a mold that is subsequently utilized to form the one or more components for the LED retrofit. For example, the CNC may generate a mold that forms the one or more components using injection molding.

Having described the embodiments in detail, those skilled in the art will appreciate that, given the present description, modifications may be made to the embodiments described herein without departing from the spirit of the disclosure. Therefore, it is not intended that the scope of the disclosure be limited to the specific embodiments illustrated and described.

The invention claimed is:

1. A centering ring for an LED retrofit lamp, the centering ring comprising:

a ring-shaped body comprising an outer ring and an opening in a central region of the ring-shaped body configured to receive an illumination body; and a lug formed in the opening that includes a first angled portion that is configured to engage a complementary angled portion of a channel in the illumination body, wherein the first angled portion has an angle of between 5° and 45° with regard to a plain perpendicular to a central axis of the centering ring.

2. The centering ring according to claim 1, further comprising:

a second angled portion formed on a proximal end of the centering ring that is configured to engage an O-Ring of the illumination body.

3. The centering ring according to claim 1, wherein the first angled portion has the angle of between 7° and 30° with regard to the plain perpendicular to the central axis of the centering ring.

4. The centering ring according to claim 1, wherein the centering ring concentrically aligns a central axis of the illumination body with a central axis of the centering ring.

5. An LED retrofit lamp comprising:

an illumination body; and a centering ring mounted to the illumination body, the centering ring comprising:

a ring-shaped body comprising an outer ring and an opening in a central region of the ring-shaped body configured to receive the illumination body, and a lug formed in the opening that includes a first angled portion that is configured to engage a complementary angled portion of a channel in the illumination body, wherein the first angled portion has an angle of between 5° and 45° with regard to a plain perpendicular to a central axis of the centering ring.

6. The LED retrofit lamp according to claim 5, wherein the centering ring further comprises:

a second angled portion formed on a proximal end of the centering ring that is configured to engage an O-Ring of the illumination body.

7. The LED retrofit lamp according to claim 5, wherein the first angled portion has the angle of between 7° and 30° with regard to the plain perpendicular to the central axis of the centering ring.

8. The LED retrofit lamp according to claim 5, wherein the centering ring concentrically aligns a central axis of the illumination body with a central axis of the centering ring.

9. A vehicle headlight comprising:

an LED retrofit lamp comprising:

an illumination body, and a centering ring mounted to the illumination body, the centering ring comprising:

a ring-shaped body comprising an outer ring and an opening in a central region of the ring-shaped body configured to receive the illumination body, and a lug formed in the opening that includes a first angled portion that is configured to engage a complementary angled portion of a channel in the illumination body; and a lamp fixture comprising a clamping spring fixation mechanism that holds the LED retrofit lamp.

10. The vehicle headlight of claim 9, wherein the centering ring further comprises:

a second angled portion formed on a proximal end of the centering ring that is configured to engage an O-Ring of the illumination body.

11. The vehicle headlight of claim 9, wherein the first angled portion has an angle of between 5° and 45° with regard to a plain perpendicular to a central axis of the centering ring.

12. The vehicle headlight of claim 11, wherein the first angled portion has the angle of between 7° and 30° with regard to the plain perpendicular to the central axis of the centering ring.

13. The vehicle headlight of claim 9 wherein the centering ring concentrically aligns a central axis of the illumination body with a central axis of the centering ring.

* * * * *